United States Patent
Gnirk et al.

(10) Patent No.: US 6,986,862 B2
(45) Date of Patent: Jan. 17, 2006

(54) METHOD OF MAKING THREE-FOLD BELLOWS AND AN ARRANGEMENT FOR CARRYING OUT THE METHOD

(75) Inventors: Wolfgang Gnirk, Lehrte (DE); Manfred Degenhardt, Pattensen (DE); Joachim Muth, Wölpinghausen (DE)

(73) Assignee: ContiTech Luftfedersysteme GmbH, Hannover (DE)

( * ) Notice: Subject to any disclaimer, the term of this patent is extended or adjusted under 35 U.S.C. 154(b) by 419 days.

(21) Appl. No.: 10/273,847

(22) Filed: Oct. 21, 2002

(65) Prior Publication Data
US 2003/0075832 A1 Apr. 24, 2003

(30) Foreign Application Priority Data
Oct. 20, 2001 (DE) .......................... 101 52 259

(51) Int. Cl.
*B29C 49/54* (2006.01)

(52) U.S. Cl. ................ 264/506; 264/508; 425/336; 425/396; 425/183; 425/190; 425/193

(58) Field of Classification Search ............... 264/506, 264/508; 425/336, 396, 190, 193, 183
See application file for complete search history.

(56) References Cited

U.S. PATENT DOCUMENTS

| | | | |
|---|---|---|---|
| 2,221,470 A | | 11/1940 | Brown |
| 2,814,072 A | | 11/1957 | Soderquist |
| 4,120,635 A | * | 10/1978 | Langecker .................. 425/535 |
| 4,749,345 A | | 6/1988 | Warmuth et al. |
| 5,560,941 A | * | 10/1996 | Hegler et al. ................ 425/185 |
| 5,578,333 A | * | 11/1996 | Schad et al. ................ 425/588 |
| 6,089,852 A | | 7/2000 | Lee et al. |
| 6,644,951 B2 | * | 11/2003 | Lupke et al. ................ 425/183 |

FOREIGN PATENT DOCUMENTS

EP        695 17 467        11/1995

* cited by examiner

*Primary Examiner*—Suzanne E. McDowell
(74) *Attorney, Agent, or Firm*—Walter Ottesen

(57) ABSTRACT

A vulcanization mold (2) includes several segments (8a, 8b; 10a, 10b; 12a, 12b; 14a, 14b) which define two end profiles (8, 10) and two inner profile shells (12, 14) having concave surfaces. With synchronous movement sequences, which take place via linear controls from both ends, the segments (8a, 8b; 10a, 10b; 12a, 12b; 14a, 14b) are moved together under simultaneous shaping pressure. The outer profile shells (8, 10) pass through twice the distance as the inner profile shells (12, 14). The forming of the work blank (20) is completed via the shaping pressure when the mold (2) has reached the closed position. Preferably the upper profile half shells (8a, 10a, 12a, 14a) and the lower profile segments (8b, 10b, 12b, 14b) are operatively connected to each other via toothed racks (40a, 46a, 48a, 54a; 40b, 46b, 48b, 54b) and gear wheels (42a, 44a, 50a, 52a; 42b, 44b, 50b, 52b) including additional sets of teeth (42a', 50a'; 42b', 50b').

6 Claims, 6 Drawing Sheets

METHOD OF MAKING THREE-FOLD BELLOWS AND AN ARRANGEMENT FOR CARRYING OUT THE METHOD

FIELD OF THE INVENTION

The invention relates to a method and a vulcanization mold for making three-fold bellows from cylindrical non-preformed work blanks without heating hoses. The invention also relates to an arrangement for carrying out the method.

BACKGROUND OF THE INVENTION

Two-fold bellows and a method of making the same have been known for a long time and reference can be made to U.S. Pat. Nos. 2,221,470; 2,814,072 and 4,749,345.

A vulcanization mold for manufacturing two-fold bellows usually comprises three segments, namely two end segments and a center segment. These three segments are, at first, spaced from each other, and are brought together in the course of the vulcanization process. The center segment remains at rest. Only the two outer segments are moved synchronously toward the center segment.

For making three-fold bellows, one requires two inner segments between the two end segments. A center segment at rest is non-existent. A synchronous moving together of the four segments is not easily possible because the individual segments have to be moved at different speeds.

SUMMARY OF THE INVENTION

It is an object of the invention to provide a method and an arrangement for carrying out a method of manufacturing a three-fold bellows with this manufacture being without a heating hose.

The method of the invention is for making a three-folded bellows with the aid of a vulcanization mold defining a longitudinal axis, the mold being partitioned into lower and upper halves by a horizontal plane passing through the longitudinal axis, the halves being configured so as to be mirror images of each other and being mounted mirror-imaged to each other, the lower half including a first plurality of segments and the upper half including a second plurality of segments which are initially in spaced relationship to corresponding ones of the segments of the first plurality of segments; the vulcanization mold having first and second end plates at mutually opposite longitudinal ends thereof; the first plurality of segments including two outer segments and two inner segments and the second plurality of segments likewise including two outer segments and two inner segments; the outer segments of the first plurality of segments and corresponding ones of the outer segments of the second plurality of segments conjointly defining two outer profile shells; the inner segments of the first plurality of segments and corresponding ones of the inner segments of the second plurality of segments conjointly defining two inner profile shells disposed between the two outer profile shells; the method comprising the steps of: placing a bellows blank in the mold and the bellows blank having first and second end faces; clamping the first and second end plates against corresponding ones of the first and second end faces of the bellows blank by synchronously moving the end plates via a linear control so that both of the end faces of the bellows blank are in sealing and form-tight engagement with the first and second end plates, respectively; driving the end plates and the segments together while simultaneously applying a shaping pressure to the bellows blank with the outer profile shells traversing twice the distance which the inner profile shells traverse whereby the shaping of the bellows blank via the shaping pressure is complete when the mold is closed; and, initiating the vulcanization process.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
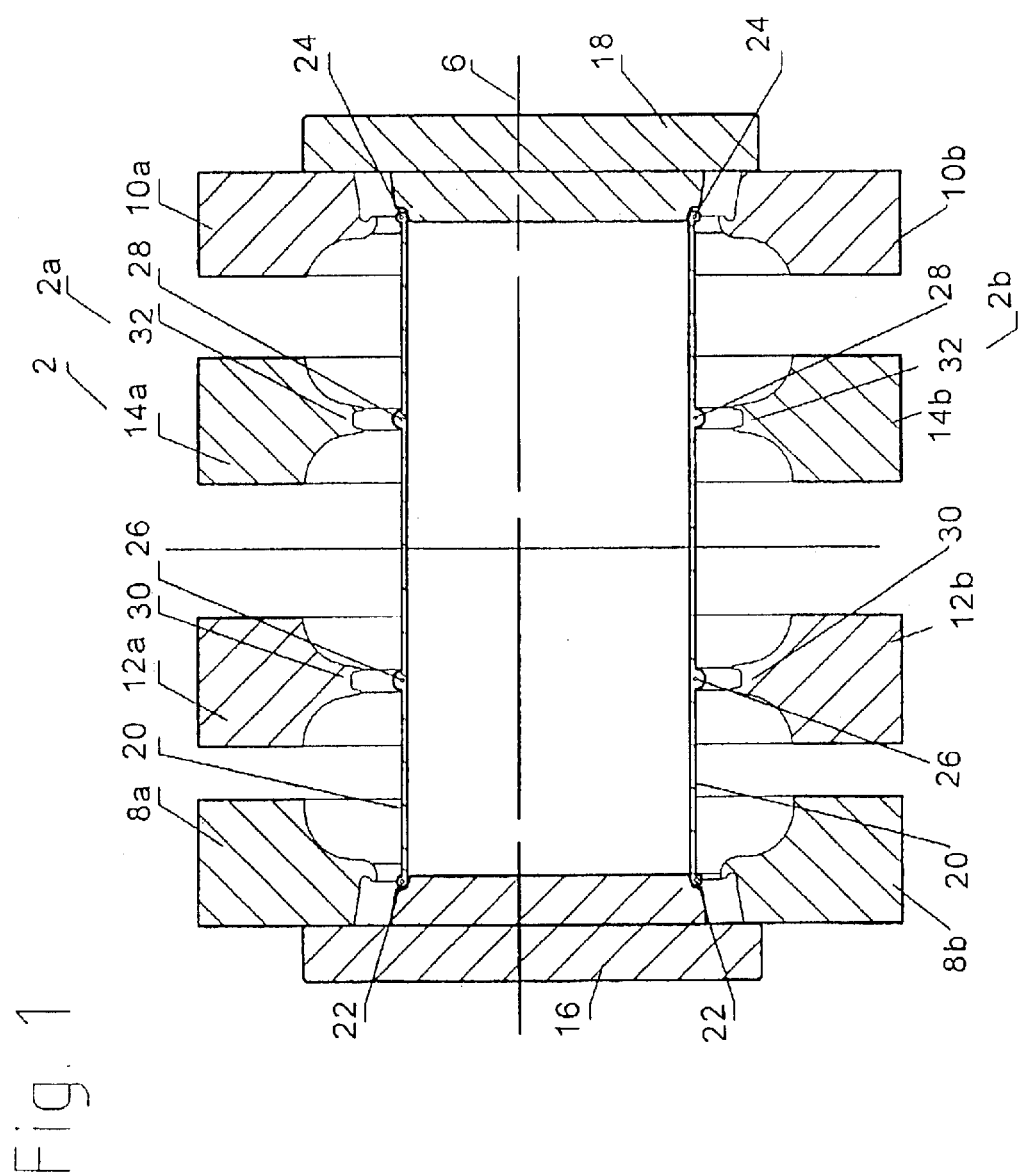
FIG. 1 is a longitudinal section view of a vulcanization mold according to the invention with a work blank placed therein.
Figure 2:
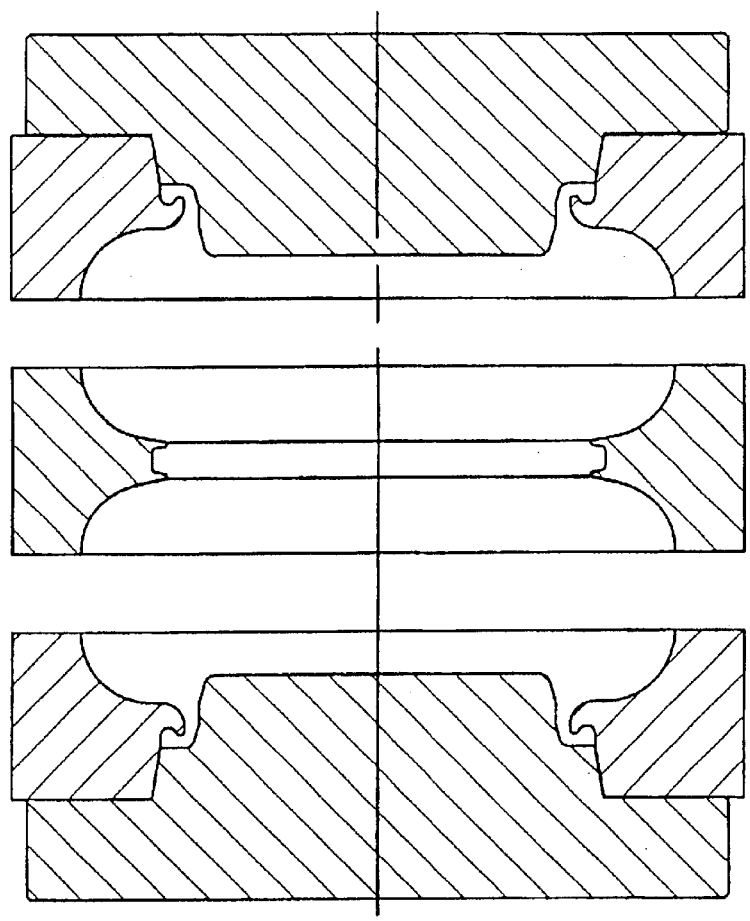
FIG. 2 is a longitudinal section view taken through a conventional vulcanization mold for making a two-fold bellows.
Figure 5:
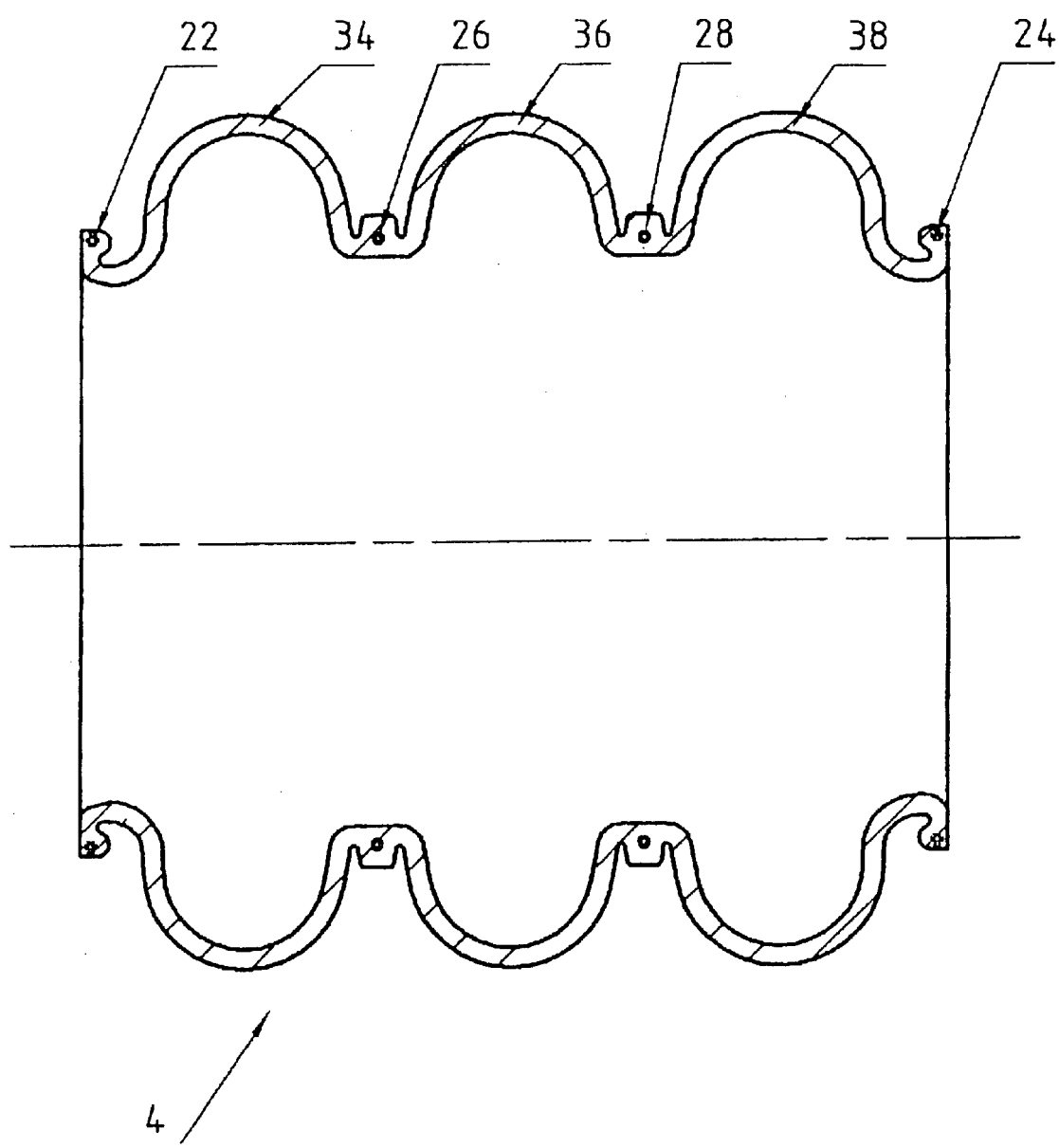

As shown in FIG. 1, the vulcanization mold 2 of the invention for making a three-fold bellows 4 (FIG. 5) is partitioned by a horizontal plane into two halves, namely, into an upper half 2a and into a lower half 2b. The longitudinal axis 6 lies in the horizontal plane and the two halves are configured as mirror images of each other, that is, they are arranged as mirror images to each other.

Each of these two halves (2a, 2b) comprises, in turn, several segments, namely, two end (outer) profile half shells (8a, 8b; 10a, 10b) at respective ends and two center (inner) profile half shells (12a, 12b; 14a, 14b) arranged between the two end half shells (8a, 8b; 10a, 10b).

Figure 3:
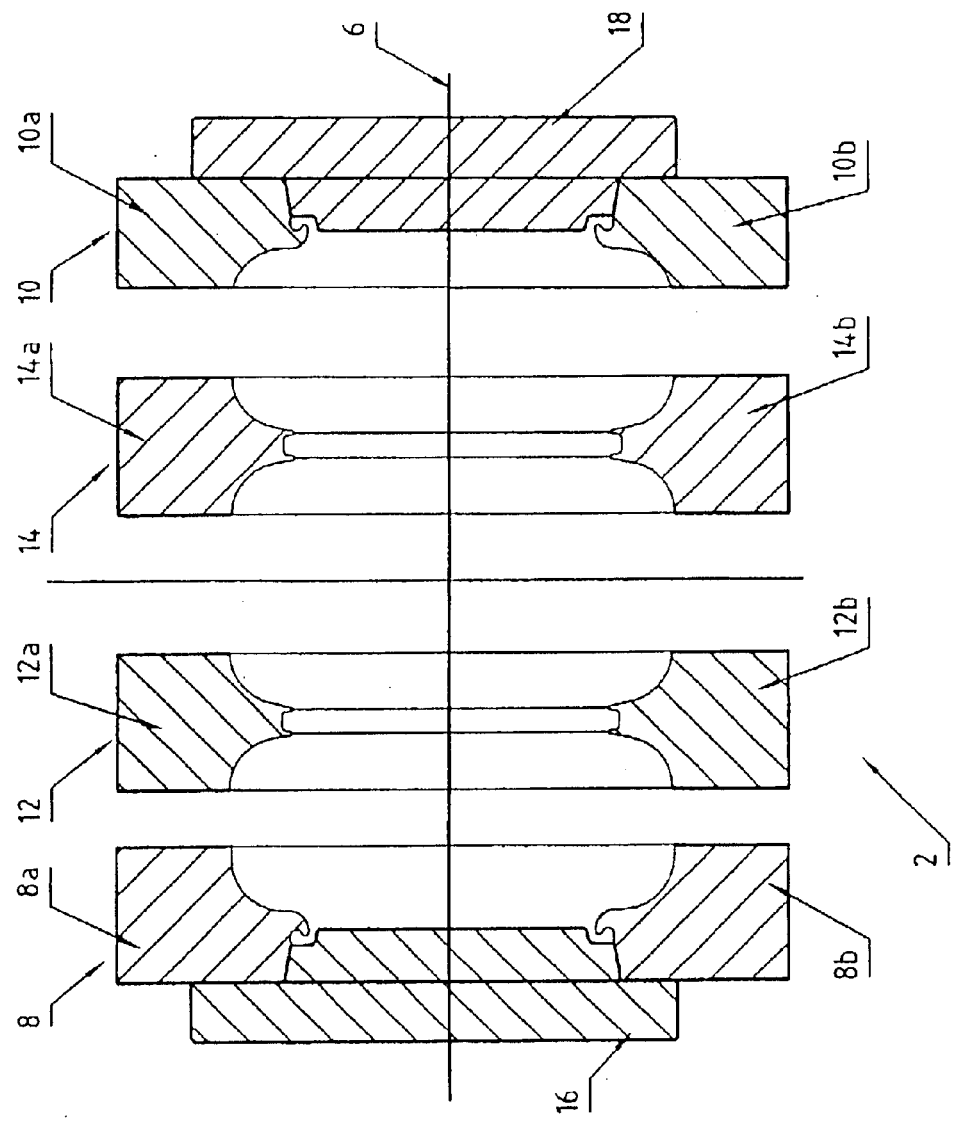
FIG. 3 is a longitudinal section view taken through the vulcanization mold of the invention with the mold shells shown closed.

An upper outer half shell 8a and a lower outer half shell 8b conjointly form a full shell 8 (FIG. 3) which has a concave inner surface on its inner side. The same applies to the upper outer half shell 10a and the lower outer half shell 10b at the other end of the vulcanization mold. The two outer half shells (10a, 10b) likewise conjointly define a full shell 10 which also has a concave inner surface.

Each upper center (inner) profile half shell (12a or 14a) and the corresponding lower center (inner) profile half shell (12b or 14b) conjointly define first and second center (inner) profile full shells (12 and 14) which are each concave on both sides, that is, each inner profile or half shell is configured to be biconcave.

The profile-imparting mold region is formed by profile shells 8, 10, 12 and 14 partitioned longitudinally at the middle. The profile segments 8a, 8b, 10a, 10b, 12a, 12b, 14a and 14b are axially guided in an upper base frame and a lower base frame (not shown) and are actuated by hydraulic cylinders (not shown) mounted at the ends on the base frame.

The mold 2 comprises the base frame, profile shells (8, 10, 12, 14) and two end plates (16, 18) mounted at respective ends of the mold. The mold 2 is built into a press (not shown) which closes vertically. The profile or product axis 6 lies horizontally.

FIG. 1 further shows a work blank 20 mounted axially between the segments 8a, 8b; 10a, 10b; 12a, 12b; 14a, 14b of the vulcanization mold 2. The work blank 20 can be provided with beads (22, 24) at its ends, respectively. At the center (inner) profile half shells 12a/12b; 14a/14b, the work blank 20 has respective wire belts (26, 28) while the center (inner) profile half shells 12a/12b; 14a/14b each have corresponding wire belt contours (30, 32).

In three-fold bellows 4, which are to be made from such work blanks 20 and which have wire belts (26, 28) vulcanized in between the folds 34, 36, 38 (FIG. 5), it is necessary that, in the open condition of the mold 2 wherein the components thereof are moved so as to be apart from each other, the spacing between the wire belt contours (30, 32) of the profile shells (12, 14) is identical to the spacing between the wire belt cores (26, 28) arranged in the work blank 20.

The work blanks 20 are placed in the mold 2 from the winding drum (not shown) without an additional work step. The deformation of the work blank 20 into the fold contour and therefore also the changes of the fabric angles of the individual fabric layers takes place uniformly.

Figure 4A:
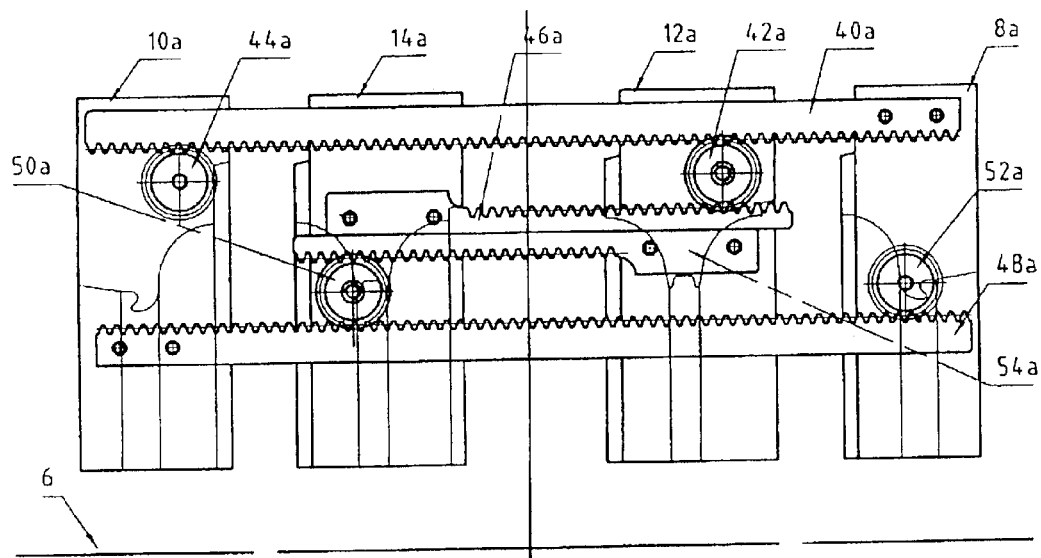
FIG. 4a is a longitudinal section view of a vulcanization mold showing the toothed-rack control according to the invention with the vulcanization mold vertically opened and driven apart horizontally.
Figure 4A:
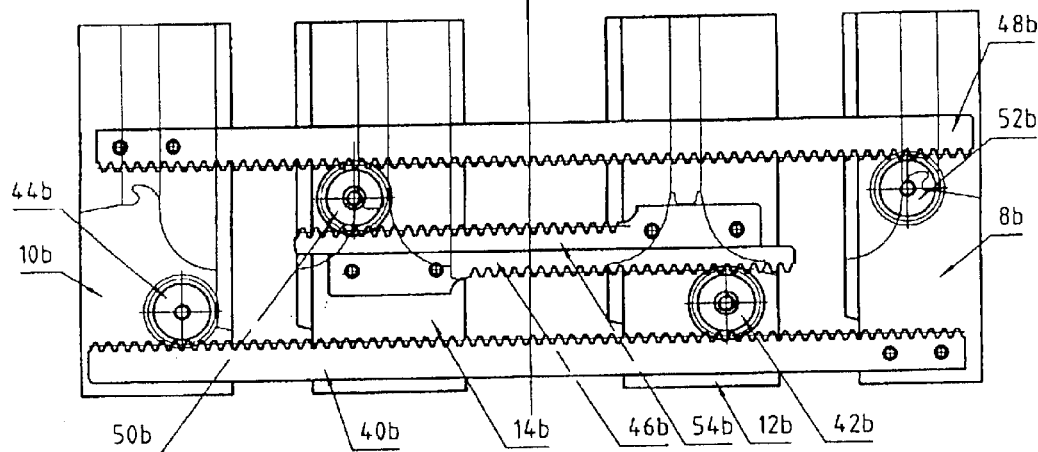
Figure 4B:
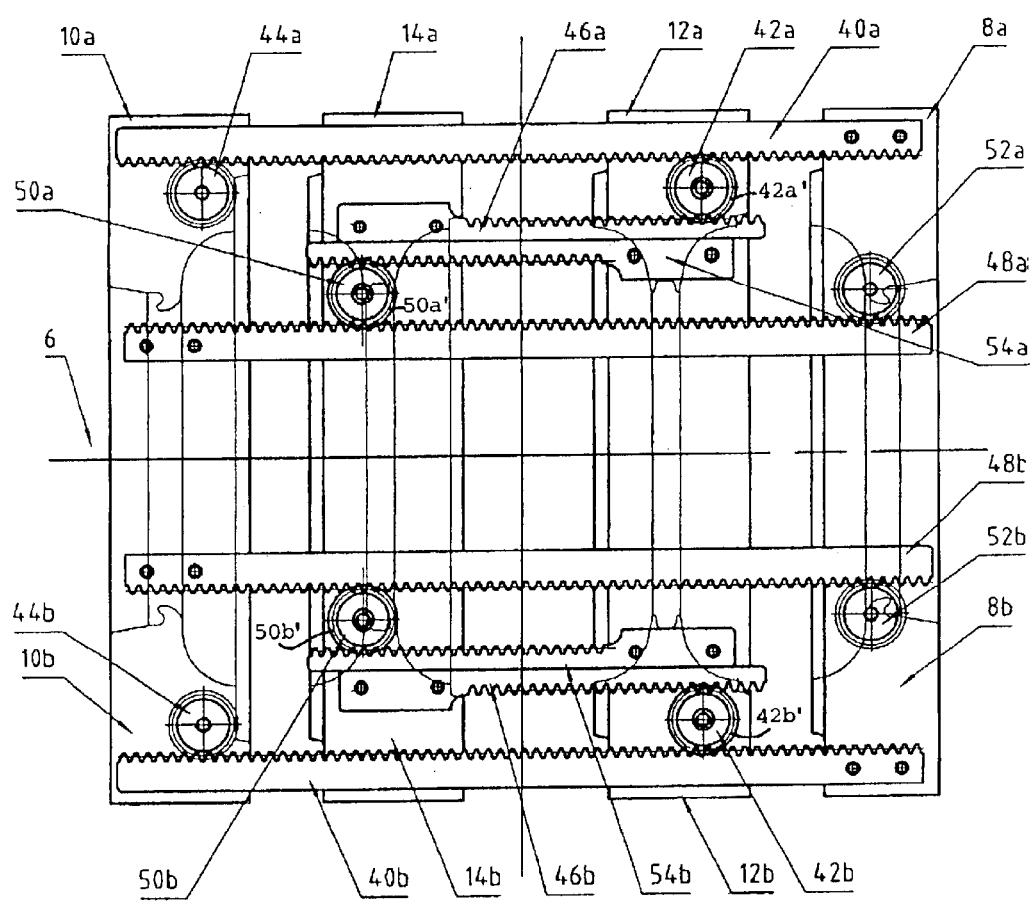
FIG. 4b shows the vulcanization mold of FIG. 4a with the mold closed vertically and with the mold parts shown driven horizontally apart; and, FIG. 5 shows a formed three-fold bellows in longitudinal section.

The upper profile segments (8a, 10a, 12a, 14a) and the lower profile segments (8b, 10b, 12b, 14b) are operatively connected to each other by toothed racks (40a, 46a, 48a, 54a; 40b, 46b, 48b, 54b) and gear wheels (42a, 44a, 50a, 52a; 42b, 44b, 50b, 52b) including additional sets of gear teeth (42a', 50a'; 42b', 50b'). In this connection, reference can be made to FIGS. 4a and 4b. The toothed rack 40a is disposed on the upper end (outer) profile half shell 8a and meshes with a gear wheel 42a and a gear wheel 44a. The gear wheel 42a is disposed on the first center (inner) profile half shell 12a and the gear wheel 44a is disposed on the other end (outer) profile half shell 10a.

The gear wheel 42a, which is disposed on the one center (inner) profile half shell 12a, has a second set of teeth 42a' having half the number of teeth. This set of teeth 42a' meshes with a toothed rack 46a attached to the second center (inner) profile half shell 14a.

Furthermore, there is a toothed rack 48a attached to the second end (outer) profile half shell 10a which meshes with a gear wheel 50a disposed on the second center (inner) profile half shell 14a and with a gear wheel 52a disposed on the first end (outer) profile half shell 8a.

The gear wheel 50a is disposed on the second center (inner) profile half shell 14a and includes a second set of teeth 50a' having half the number of teeth. This set of teeth 50a' meshes with a toothed rack 54a attached to the first center (inner) profile half shell 12a.

In the lower profile segments (8b, 10b, 12b and 14b), there is synchronous coupling compared to the upper coupling.

Here too, a toothed rack 40b is disposed on the lower end (outer) profile half shell 8b which meshes with a gear wheel 42b disposed on the first lower center (inner) profile half shell 12b and meshes with a gear wheel 44b disposed on the other end (outer) profile half shell 10b.

The gear wheel 42b is disposed on the center (inner) profile half shell 12b and has a second set of teeth 42b' having half the number of teeth. This set of teeth 42b' meshes with a toothed rack 46b disposed on the second center (inner) profile half shell 14b.

Furthermore, there is a toothed rack 48b attached to the second lower end (outer) profile half shell 10b, which meshes with a gear wheel 50b and with a gear wheel 52b. The gear wheel 50b is disposed on the second center (inner) profile half shell 14b and the gear wheel 52b is disposed on the first end (outer) profile half shell 8b.

Here too, the gear wheel 50b on the second center (inner) profile half shell 14b has a second set of teeth 50b' having half the number of teeth. This set of teeth 50b' meshes with a toothed rack 54b attached to the first center (inner) profile half shell 12b.

In lieu of the propulsion with toothed racks and gear wheels, a comparable other drive can be used. This drive can be a linear mechanical, electromechanical or pneumatic drive.

With controlled movement sequences, which take place synchronously via toothed rack controls from both sides, the ends of the work blank 20 are first clamped seal tight and form imparting at both ends to corresponding ones of the end plates (16, 18). In the further movement sequence, the end plates (16, 18) move the profile shells 8, 10, 12, 14 together at simultaneous shaping pressure in such a manner that the outer profile shells (8, 10) traverse twice the distance that the inner profile shells (12, 14) traverse. The shaping of the work blank 20 via the shaping pressure is completed when the mold 2 has reached the closed position. The vulcanization operation is then initiated.

Movement Sequences

I. Open Position of the Mold 2

The three-fold bellows press is in the open position. Here, the mold 2 is opened vertically. The end plates (16, 18) of the mold 2 are in the opened position via the two hydraulic cylinders. The clear distance between the opened end plates (16, 18) is about the length of the work blank plus 20 mm. The end parts of the mold 2 are moved apart over a limited path, which is to be adjusted, the same amount in the upper part 2a and the lower part 2b. The limited path is approximately half of the opening stroke.

II. Placement of the Work Blank 20

The work blank 20 is placed in the open lower half 2b. The inner cones of the end plates (16, 18) penetrate about 10 mm per end into the work blank 20 and center the same at the ends. The mold center parts (12, 14) take up the placed cores (26, 28) of the work blank 20. The end plates (16, 18) are moved to the length of the work blank. The press drives closed in such a manner that the mold 2 is closed vertically but no closing pressure of the press is at the mold partition surfaces. The end plates (16, 18) are actuated via the coupled hydraulic cylinders and are moved against the mold end parts (8, 10) and clamp the respective work blank beads 22 and 24 seal-tight and with respect to form. The two large hydraulic cylinders move the mold 2 axially into the closed position under simultaneous shaping pressure in the work blank 20. The closing movement of the mold end parts (8, 10) and the mold inner parts (12, 14) takes place synchronously via a toothed rack control. The outer end parts (8, 10) move through twice the distance as do the inner parts (12, 14). In the axial open position, the position of the two center part distances must be identical to the distance of the two inner cores (26, 28) of the work blank 20.

The forming of the work blank 20 via the shaping pressure is completed when the mold 2 has reached the closed position. The vulcanization process can then be initiated.

III. Opening of Mold 2

After the completion of the vulcanization process, the end plates (16, 18) must first be moved when opening the mold 2. Thereafter, the mold end parts (8, 10) and inner parts (12, 14) move approximately 10 mm apart in order to release the article in the mold 2 and only then does the press open. The article can now be removed. Only after removal of the article are the mold end parts moved into the position described under I. The mold shells are guided on the running surfaces of the mold frame via guide elements having dry-running characteristics. These guide surfaces should not come in contact with lubrication means.

It is understood that the foregoing description is that of the preferred embodiments of the invention and that various changes and modifications may be made thereto without departing from the spirit and scope of the invention as defined in the appended claims.

What is claimed is:

1. A method for making a three-folded bellows with the aid of a vulcanization mold defining a longitudinal axis, the mold being partitioned into lower and upper halves by a horizontal plane passing through said longitudinal axis, said halves being configured so as to be mirror images of each other and being mounted mirror-imaged to each other, said lower half including a first plurality of segments and said upper half including a second plurality of segments which are initially in spaced relationship to corresponding ones of the segments of said first plurality of segments;

said vulcanization mold having first and second end plates at mutually opposite longitudinal ends thereof;

said first plurality of segments including two outer segments and two inner segments and said second plurality of segments likewise including two outer segments and two inner segments;

said outer segments of said first plurality of segments and corresponding ones of said outer segments of said second plurality of segments conjointly defining two outer profile shells;

said inner segments of said first plurality of segments and corresponding ones of said inner segments of said second plurality of segments conjointly defining two inner profile shells disposed between said two outer profile shells;

the method comprising the steps of:

placing a bellows blank in said mold and said bellows blank having first and second end faces;

clamping said first and second end plates against corresponding ones of said first and second end faces of said bellows blank by synchronously moving said end plates via a linear control so that both of said end faces of said bellows blank are in sealing and form-tight engagement with said first and second end plates, respectively;

driving said end plates and said segments together while simultaneously applying a shaping pressure to said bellows blank with said outer profile shells traversing twice the distance which said inner profile shells traverse whereby the shaping of said bellows blank via said shaping pressure is complete when said mold is closed; and, initiating the vulcanization process.

2. The method of claim 1, wherein said first and second end plates have respective inner cones facing toward each other; said bellows blank has wire cores embedded therein at the location of said inner profile shells, respectively, as well as end beads at respective longitudinal ends thereof; said inner profile shells has respective contours formed therein for receiving corresponding ones of said wire cores; and, wherein said inner cones push approximately 10 mm into corresponding ones of said end faces of said bellows blank when said first and second end plates are clamped thereagainst thereby precentering said bellows blank while, at the same time, said contours of said inner profile shells receive said wire cores therein;

thereafter, said end plates are driven to the length of said bellows blank with said mold halves being brought together so that said mold is vertically closed but no closing pressure is present at the partition surfaces of said mold halves;

then, said end plates are moved against said end faces of said bellows blank so as to clamp said end beads form and seal tight;

then, said mold is driven into the closed position thereof while at the same time applying shaping pressure in the bellows blank with said outer profile shells and said inner profile shells being synchronously driven toward each other utilizing a toothed rack control while said outer profile shells traverse a distance twice the distance traversed by said inner profile shells; and, initiating said vulcanization process when the closed position of said mold is reached.

3. An arrangement for making a three-folded bellows from a bellows blank, the arrangement comprising:

a vulcanization mold defining a longitudinal axis;

said mold being partitioned into lower and upper halves by a horizontal plane passing through said longitudinal axis;

said halves being configured so as to be mirror images of each other and being mounted mirror-imaged to each other;

said lower half including a first plurality of segments and said upper half including a second plurality of segments which are in spaced relationship to corresponding ones of the segments of said first plurality of segments;

said vulcanization mold having first and second end plates at mutually opposite longitudinal ends thereof;

said first plurality of segments including two outer segments and two inner segments and said second plurality of segments likewise including two outer segments and two inner segments;

said outer segments of said first plurality of segments and corresponding ones of said outer segments of said second plurality of segments conjointly defining two outer profile shells;

said inner segments of said first plurality of segments and corresponding ones of said inner segments of said second plurality of segments conjointly defining two inner profile shells disposed between said two outer profile shells;

each of said outer profile shells being configured to have a concave inner surface; and, each of said inner profile shells being configured to have concave surfaces on both sides thereof.

4. The arrangement of claim 3, wherein said mold is built into a press.

5. The arrangement of claim 3, wherein said bellows blank has two wire cores embedded therein at a predetermined first distance apart from the other; said profile shells have respective contours formed therein to receive corresponding ones of said wire cores; said mold have an open state wherein said inner profile shells are driven apart to a first position so as to define a second distance between said contours; and, said first distance is equal to said second distance.

6. The arrangement of claim 3, further comprising:

a first plurality of toothed racks and a first plurality of gear wheels operatively connected to said first plurality of segments;

a first one of said toothed racks being connected to one of said outer segments of said first plurality of segments;

a first gear wheel having a first set of gear teeth and being mounted on a first one of said inner segments of said first plurality of segments and said first gear wheel being in meshing engagement with said first toothed rack with said first set of gear teeth;

a second gear wheel mounted on the other one of said outer segments of said first plurality of segments and said second gear wheel being in meshing engagement with said first toothed rack;

said first gear wheel having a second set of gear teeth having half the number of teeth as said first set thereof;

a second toothed rack attached to the other one of said inner segments and being in meshing engagement with said second set of gear teeth of said first gear wheel;

a third toothed rack attached to the other one of said outer segments of said first plurality of segments;

a third gear wheel mounted on the other one of said inner segments and having a first set of gear teeth in meshing engagement with said third toothed rack;

a fourth gear wheel mounted on said one outer segment of said first plurality of segments and being in meshing engagement with said third toothed rack;

said third gear wheel having a second set of gear teeth having half the number of gear teeth as said first set of gear teeth of said third gear wheel;

a fourth toothed rack attached to the other one of said inner segments of said first plurality of segments and being in meshing engagement with said second set of gear teeth of said third gear wheel; and, a second plurality of toothed racks and a second plurality of gear wheels operatively connected to said second plurality of segments so as to operate in synchronism with said first plurality of toothed racks and said first plurality of gear wheels.

* * * * *